United States Patent [19]

Frisby

[11] Patent Number: 5,073,924
[45] Date of Patent: Dec. 17, 1991

[54] TELEPHONE LINE NOISE FILTER APPARATUS

[76] Inventor: Kenneth G. Frisby, 4713 E. Shangri-La, Phoenix, Ariz. 85621

[21] Appl. No.: 517,025

[22] Filed: May 1, 1990

[51] Int. Cl.⁵ .............................................. H04M 1/00
[52] U.S. Cl. .................................. 379/394; 379/414; 379/416
[58] Field of Search ............... 379/394, 398, 399, 400, 379/414, 416, 98

[56] References Cited

U.S. PATENT DOCUMENTS

| | | |
|---|---|---|
| 308,019 | 11/1884 | Hoevenbergh . |
| 781,525 | 1/1905 | Stone . |
| 1,791,377 | 2/1931 | Proskauer et al. . |
| 1,824,819 | 9/1931 | Houck . |
| 1,949,996 | 3/1934 | Fleming . |
| 2,277,216 | 3/1942 | Epstein . |
| 2,621,252 | 12/1952 | Pontius . |
| 2,732,528 | 1/1956 | Anderson . |
| 3,009,121 | 11/1961 | Loebenstein . |
| 3,270,142 | 8/1966 | Wilson ................................ 379/394 |
| 3,305,801 | 2/1967 | Hartenstein . |
| 3,350,510 | 10/1967 | Knauer et al. ....................... 379/394 |
| 3,402,372 | 9/1968 | Wasyluk . |
| 3,582,563 | 6/1971 | Cragg .................................. 379/394 |
| 4,498,010 | 2/1985 | Löfmark .............................. 379/394 |
| 4,701,946 | 10/1987 | Oliva et al. .......................... 379/394 |
| 4,723,278 | 2/1988 | Nishio et al. ........................ 379/394 |
| 4,759,059 | 7/1988 | Christensen ......................... 379/394 |
| 4,951,312 | 8/1990 | Tanikawa et al. ................... 379/394 |

FOREIGN PATENT DOCUMENTS

| | | | |
|---|---|---|---|
| 8810539 | 12/1988 | European Pat. Off. ............ | 379/394 |
| 3716835 | 12/1988 | Fed. Rep. of Germany ...... | 379/394 |

Primary Examiner—James L. Dwyer
Assistant Examiner—Jhancy Augustus
Attorney, Agent, or Firm—H. Gordon Shields

[57] ABSTRACT

Filter circuitry for filtering noise from a pair of telephone conductors connected to a modem or a facsimile transmission unit includes a capacitor in series with a fixed resistor. A vaariable resistor is connected in series with the capacitor and the fixed resistor. The capacitor is non-polarized. A switch is connected in series with the filter elements for selectively connecting and disconnecting the filter from the telephone conductors.

3 Claims, 1 Drawing Sheet

TELEPHONE LINE NOISE FILTER APPARATUS

BACKGROUND OF THE INVENTION

1. Field of the Invention

This invention relates to telephone circuits and, more particularly, to noise filter apparatus for telephone lines.

2. Description of the Prior Art

From the beginning of telephonic systems, noise has been a problem. The term "noise" refers to any type of undesirable signals on a telephone line which interferes with communication or communication signals on the lines.

With the increased use of modems for communicating between computers using telephone lines and the use of Facsimile transmission machines also using telephone lines, the problem of noise on telephone lines becomes increasingly acute. This is so even though telephone lines inherently, due to advances in telephone systems and associated circuitry, technology, etc., are more and more noise free. However, there is still noise or undesirable signals at various frequencies in telephone lines, and such noise may interfere with, and cause problems with, facsimile machines and computer modems by distorting the appropriate signals or adding to the signals to distort the actual signals being transmitted and received.

Typically, echoes are used by modems and by facsimile transmission equipment between transmitting and receiving equipment to verify original data. However, the echoes tend to reverberate and eventually turn into or become noise on the line. The undesirable echoes need to be filtered out of the circuitry before they become noise and interfere with proper and desired transmission.

An early patent, U.S. Pat. No. 308,019 (Van Hoevenbergh) discloses an early attempt to reduce noise by using a condenser in the line and connected to ground or earth.

U.S. Pat. No. 781,625 (Stone) discloses another use of capacitors to reduce noise. In one embodiment, a pair of capacitors is connected between the telephone lines, and the connection between the capacitors is grounded.

U.S. Pat. No. 1,791,377 (Proskauer et al) discloses another type of filter system for reducing alternating current hum in radios, and the like. The apparatus includes a pair of condensers coupled between the power line between the power outlet and the radio set. The junction of the capacitors is grounded. In the two line conductors themselves are resistors. That is, a resistor is in each conductor between the outlet and the capacitors.

U.S. Pat. No. 1,824,819 (Houck) discloses another type of electrical filter system for filtering radio frequency from power lines utilizing capacitors and inductors.

U.S. Pat. No. 1,949,996 (Fleming) discloses another system of connecting electrical appliances to a power line to filter out ac hum and other undesirable interference from radios connected to the power line. Again, capacitors are used. One embodiment discloses resistors in each of the power conductors with a pair of capacitors coupled between the conductors and the coupling between the capacitors is grounded. Other embodiments eliminate the resistors, but a pair of capacitors is disposed across the lines and a conductor between the two condensers is grounded.

U.S. Pat. No. 2,277,216 (Epstein) discloses an electrical outlet unit which includes a filter system. The filter includes simply a capacitor connected to one of the conductors and grounded.

U.S. Pat. No. 2,621,252 (Pontius) discloses another type of filter system utilizing a coil and a ground capacitor.

U.S. Pat. No. 2,732,528 (Anderson) discloses a wave filter for suppressing alternating current interference while allowing dc signal pulses. The filter system includes two sections, a suppression-type section and a low-pass section.

U.S. Pat. No. 3,009,121 (Loebenstein) discloses an adjustable frequency rejection filter. The filter circuitry may be adjusted to reject selected alternating current components. The apparatus utilizes capacitors connected to ganged potentiometers. Circuitry for smoothing a non-linear circuit to remove noise from pulsed signals. The apparatus is designed particularly for smoothing pulsed modulated telemetry signals. A non-linear circuit is connected in series in one conductor, and a capacitor is connected between a pair of conductors. The non-linear circuit comprises a pair of diodes connected in parallel, back to back relationship.

U.S. Pat. No. 3,305,801 (Hartenstein) discloses a smoothing circuit which includes a non-linear circuit connected in series in one conductor of a two conductor pair, and a capacitor is connected across the two conductors. The non-linear circuit includes a pair of diodes connected in parallel in a back-to-back relationship. The circuit is designed to eliminate noise from pulse signals typically used in telemetry.

U.S. Pat. No. 3,402,372 (Wasyluk) discloses various RC networks built on monolithic circuit structures from telephone circuits used by modems and facsimile transmission equipment. Accordingly, none of the above-discussed filter systems is capable of filtering noise from such telephone lines. The apparatus of the present invention includes circuitry designed specifically for filtering undesirable noise from telephone lines used for modems and facsimile transmission equipment.

SUMMARY OF THE INVENTION

The invention described and claimed herein comprises a filter system designed to suppress or filter echoes and other undesirable noise from a pair of telephone conductors to which a modem or a facsimile transmission machine is secured. The filter system includes a non-polarized capacitor and a fixed resistor in series with a variable resistor across a pair of telephone lines. If desired, an in-line switch may be included in series with the filtering elements so that the filter circuitry may be selectively activated in the telephone system.

Among the objects of the present invention are the following:

To provide new and useful filter apparatus for filtering undesirable noise from telephone lines;

To provide new and useful filter apparatus selectively connected between a pair of telephone conductors;

To provide new and useful apparatus for filtering undesirable noise from telephone lines connected to the modems and facsimile equipment;

To provide new and useful filter apparatus including a capacitor and a fixed resistor in series with a variable resistor; and To provide new and useful apparatus for filtering noise from a pair of telephone conductors in which the filter apparatus is selectively connected between the pair of conductors.

DESCRIPTION OF THE PREFERRED EMBODIMENT

Figure 1:
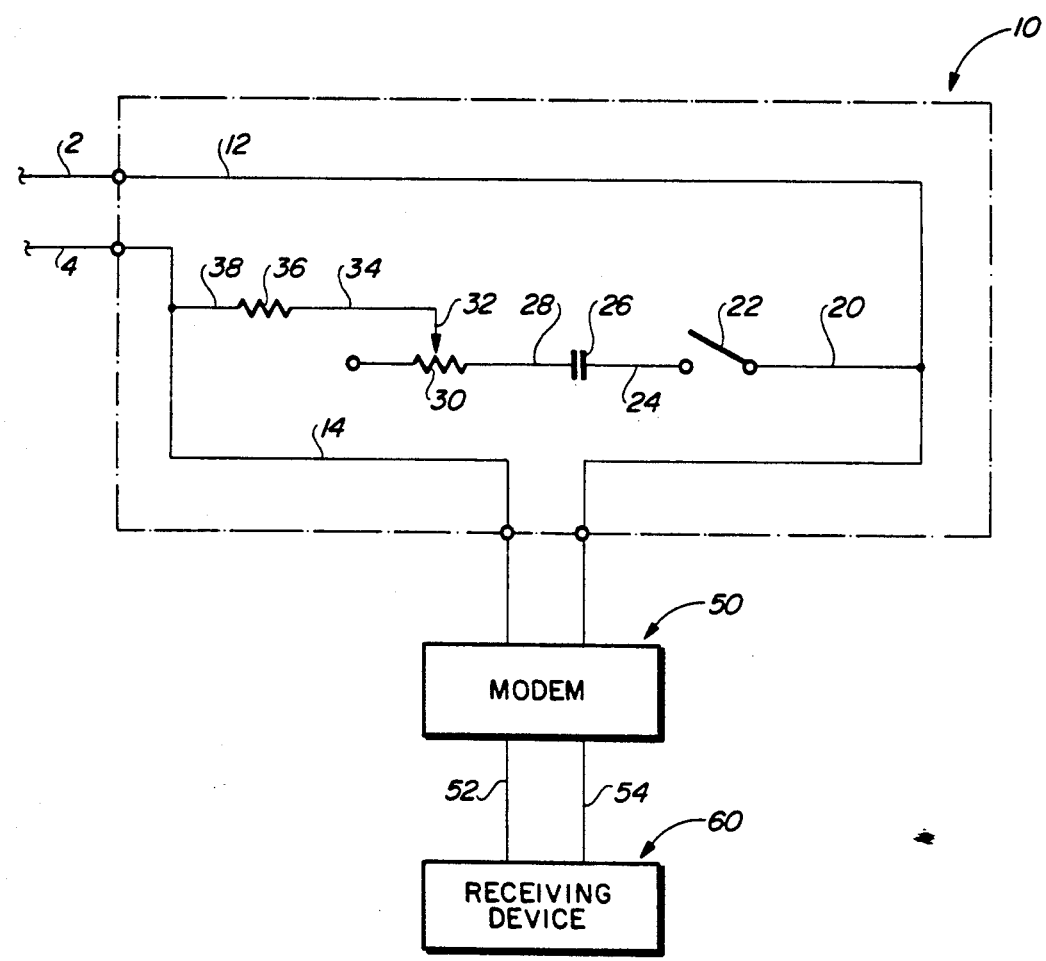
FIG. 1 is a schematic circuit diagram of the apparatus of the present invention in its use environment.

FIG. 1 is a circuit diagram illustrating the filter apparatus 10 connected to a pair of telephone lines 2 and 4. Adjacent to the filter circuitry 10 is a modem 50. The modem 50 is in turn connected to a receiving device 60 by a pair of conductors 52 and 54. The receiving device 60 may be a computer or a facsimile transmission unit. As is well known and understood, all facsimile transmission machines includes a modem of some type built into them. For computers, a separate modem is typically required. For computers, the modem may be an internal modem, as build onto a card and installed within a cabinet in a slot therein, or the modem may be an exterior, free-standing unit. In such case, of course, the modem is appropriately connected to the computer.

In telephone vernacular, the terms "tip" and "ring" are used to designate different conductors. The terms "tip" and "ring" are hold-over terms from the early days of telephone systems in which a plug was connected to two conductors. The tip of the plug was connected to one conductor, and there was a ring disposed about the tip conductor and separated from it by an appropriate insulative element. Thus, a two-wire conductor was connected to a single plug, and the plug would in turn be received by a jack connected again to two conductors.

The terms "tip" and "ring" have thus been used consistently over the years by people involved in the installation and servicing of telephones and telephone circuitry even though other terms may be more appropriate under contemporary circuitry standards. For example, line 1 and line 2 may also be appropriately used, or red and green may also be used, particularly in referring to the in-house conductors associated with each telephone unit. Typically, the red and green conductors are the active pair which actually carry the telephone signal to a telephone, a modem, etc.

In FIG. 1, telephone conductor 2 may be referred to as line 1, or tip, or the like, and conductor may be referred to as "ring", line 2, or the like. At any rate, the telephone conductor pair of conductors 2 and 4 is appropriately connected to the filter apparatus 10, and the filter apparatus 10 is in turn connected to the modem 50.

The filter apparatus 10 includes a pair of conductors 12 and 14 which are connected respectively to the telephone conductors 2 and 4.

The conductor 20 is connected to the conductor 12 and extends to a switch 22. The switch 22 is a simple in-line, single pole, single throw switch extending between conductor 20 and a conductor 24. The conductor 24 extends from the switch 22 to a capacitor 26. The capacitor 26 is a non-polarized capacitor connected in series between the conductor 24 and a conductor 28. The conductor 28 extends from the capacitor 26 to a variable resistor or potentiometer 30. The variable resistor 30 includes a wiper 32 connected to a conductor 34. The conductor 34 extends from the wiper 32 to a fixed resistor 36. The fixed resistor 36 extends from the conductor 34 to a conductor 38. The conductor 38 is in turn connected to the conductor 14.

The filter circuitry 10 includes a switch 22 for selectively connecting and disconnecting the circuit components between the conductors 12 and 14. Thus, the circuitry 10 is not necessarily always active in its filter capacity.

The circuitry of the filter apparatus 10 includes the non-polarized capacitor 26 and the fixed resistor 36. The values of those two fixed elements may, of course, vary, depending on a particular application. However, typically the capacitor 26 may have a value of about 4.7 microfarade. The value of the fixed resistor 36 may vary between about 100 ohms and about 470 ohms.

The variable resistor 30 may also vary in value, but typically may be about 5,000 ohms. The purpose of the variable resistor 30 is, of course, to allow the circuitry apparatus 10 to be adjusted for the particular application of its use environment, which depends on the particular telephone line in which it is installed, the characteristics of the modem 50, and the characteristics of the receiving device 60.

The values of the capacitor 26 and the variable resistor 30, as discussed above, are minimum values, and they may exceed the values given, depending on the particular application, as is well known and understood in the art.

The variable resistor of the variable resistor or potentiometer 30 regulates the amount of capacitance of the capacitor 26, and the fixed resistor 36 regulates a minimum resistance in the circuitry. As is well known and understood, the capacitor 26 is the primary filter element, and the variable resistor 30 and the fixed resistor 36 are used to maximize the efficiency of the capacitor 26 and of the overall apparatus in removing voltage spikes, voltage surges, and other noise elements from analog telephone lines in order to permit the transmission of data. While echoes are used to verify the original data, they may also reverberate and eventually turn into noise. The undesirable echoes accordingly need to be filtered out. The circuitry apparatus 10 filters them out so as to maximize the efficiency of the data transmission.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Filter apparatus for filtering noise from a telephone line connected to a modem and a receiving device, comprising, in combination:
   a first telephone line connected to the modem;
   a second telephone line connected to the modem; and
   filter means extending between the first and second telephone lines, including
      a fixed resistor connected to the first telephone line,
      a variable resistor connected in series with the fixed resistor,
      a non-polarized capacitor connected to the second telephone line and in series with the variable resistor, and a switch for selectively connecting and disconnecting the filter means from the second telephone line.

2. Filter apparatus for filtering noise from a pair of telephone conductors, comprising, in combination:
a fixed resistor element;
a variable resistor element connected in series with the fixed resistor; element and
a capacitor element connected in series with the fixed resistor element and the variable resistor element, and
the fixed resistor element, the variable resistor element, and the capacitor element are connected between the pair of telephone conductors; and
a switch in series with the fixed resistor element, the variable resistor element, and the capacitor element to selectively connect the elements and disconnect the elements from one of the pair of telephone conductors.

3. The apparatus of claim 2 in which the capacitor element is non-polarized.

* * * * *